Feb. 11, 1958  C. G. GORDON  2,822,821
BALANCED FLUID VALVE
Filed Oct. 5, 1953
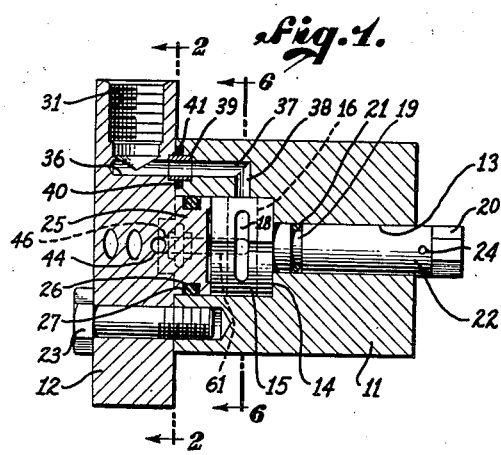
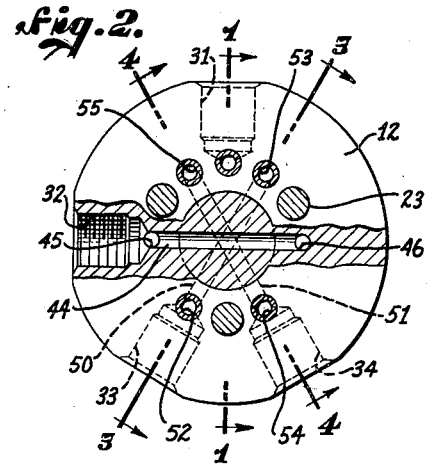
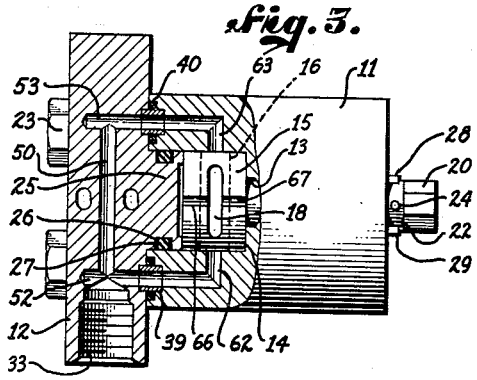
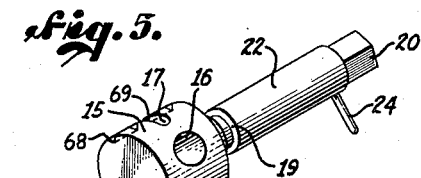
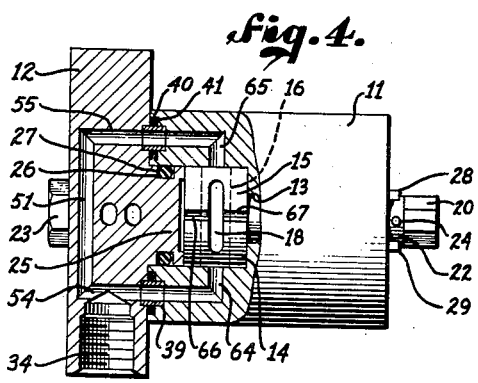
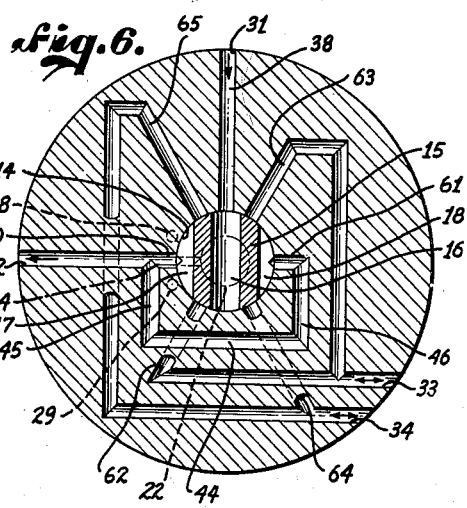
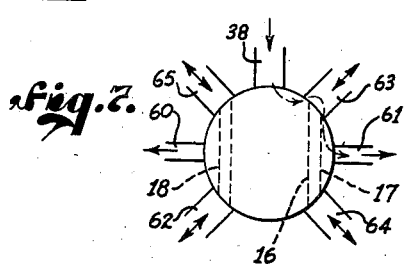
INVENTOR,
CARROLL G. GORDON
BY HIS ATTORNEYS,
HARRIS, KIECH, FOSTER & HARRIS.

United States Patent Office 2,822,821
Patented Feb. 11, 1958

2,822,821

BALANCED FLUID VALVE

Carroll G. Gordon, Pasadena, Calif.

Application October 5, 1953, Serial No. 384,196

4 Claims. (Cl. 137—624)

The present invention relates to a new and improved type of balanced fluid valve. More specifically, it relates to an improved type of rotary valve primarily useful with high pressure hydraulic systems.

The art of valve structures is a very old one. Unfortunately, however, this art is not developed to a sufficient extent to provide satisfactory valves which can be used with pressures up to around 6000 p. s. i. gauge encountered with hydraulic mechanisms such as are used with various servo devices. A great many attempts have been made in the past to produce valves of the broad class described which can be used satisfactorily with such mechanisms. None of these prior attempts, however, have been completely effective. Frequently, the cause of the difficulty has been in the fact that the metal employed tends to warp under the very high pressures involved. This warpage can usually be considered to have been the result of cross section changes associated with relatively long-linear dimensions that allow unsymmetrical deflection under pressure because of non-uniform stress distribution in all materials. In general, it has been found that the more complex the valve structure, the more chance there is of difficulty with it.

It is an object of the present invention to produce a new and improved type of rotary valve structure which is primarily useful under very high pressures for hydraulic work with servomechanisms. It is a further object to produce a valve of the class described which overcomes the foregoing and related disadvantages of the prior art valves used for the same purposes. A still further object is to produce a new and improved valve structure which can be easily and conveniently manufactured and which is extremely effective in use. Further objects of the invention, as well as the advantages of it, will be apparent from the rest of this specification and the appended claims, as well as the accompanying drawings, in which:

Fig. 1 shows a cross-sectional view of a new valve of the present invention taken at line 1—1 of Fig. 2 of the drawing;

Fig. 2 shows a cross-sectional view of a valve taken at line 2—2 of Fig. 1 of the drawing;

Fig. 3 shows a cross-sectional view taken at line 3—3 of Fig. 2 of the drawing;

Fig. 4 shows a similar cross-sectional view taken at line 4—4 of Fig. 2 of the drawing;

Fig. 5 is a perspective view of a new and improved valve rotor employed by the present invention;

Fig. 6 is a diagrammatic explanation of the operation of the valve of the present invention, the part of the valve structure illustrated in this figure being taken across line 6—6 of Fig. 1 of the drawing; and Fig. 7 is a diagrammatic explanation of the operation of the valve of the present invention when designed for an open center valve hydraulic system. The part of the valve structure illustrated in this figure is taken across line 6—6 of Fig. 1 of the drawing but incorporates variations necessary to an open center valve hydraulic system.

Briefly, the above and related aims of the invention are achieved by forming a fluid valve for hydraulic purposes utilizing a cylindrical valve rotor, having a single internal bore and slots or passages located in a bilaterally symmetrical manner with respect to a line drawn through the axis of said rotor, in a close fitting cylindrical valve cavity into which a plurality of fluid passages lead, these passages being arranged in a bilaterally symmetrical manner about a line drawn through the axis of said cylindrical cavity.

Perhaps the present invention will be best explained with reference to the accompanying figures of the drawing. In Fig. 1, it is seen that the valve of the present invention consists essentially of a base portion 11 connected by appropriate bolts 23 to a top body portion 12. The lower portion 11 is provided with a cylindrical shaft bore 13 connected to an upper cylindrical valve body bore 14 of larger diameter than the lower shaft bore 13. Within this shaft bore there is positioned an appropriate shaft 22 attached at its upper extremity to a cylindrical valve body portion or valve rotor 15 provided with a center passage or reservoir 16, located at right angles to the axis of this valve rotor, and side symmetrical slots or passages 17 and 18 which are positioned parallel to the center passage 16 and in the same plane as this passage. Midway along the shaft 22 there is provided a groove 19 adapted to contain an O-ring 21 so as to seal this shaft against fluid leakage. The part of the shaft 22 furthest removed from the valve body 15 is provided with an appropriate nonround connecting section 20. Other similar means such as, for example, tapped openings, keyways, or the like, can be used in place of this nonround section.

The top body portion 12 is provided with an appropriate boss 25 of the same diameter as the valve body bore 14 and adapted to fit therein. This boss carries an annular groove 26 adapted to hold an O-ring 27 to seal the valve body bore 14 against fluid leakage. As noted in Fig. 1 of the drawing, the boss 25, when the parts are assembled, fits snugly against the valve body 15.

The top body portion 12 is provided with a plurality of openings so as to make connection to the various fluid lines employed with the mechanism. A tapped opening 31 is, for convenience, designated as a pressure source and leads by means of a bore 36 in the body 12 to corresponding bore 37 communicating with a radial pressure supply passage opening 38 within the base 11 leading to the valve body bore 14. The bore 37 is connected to the bore 36 by means of a small sleeve 39 fitted within both the bodies 11 and 12 and sealed externally by an O-ring 40 positioned within a groove 41 in the valve body 11.

As shown in Fig. 2, a return tapped opening 32 is also provided within the top body portion 12. It is connected by means of a radial passage 44 to parallel bores 45 and 46 communicating with appropriate corresponding bores leading to openings 60 and 61 in the base 11 leading toward the valve body bore 14 in the same manner in which the bore 37 and the passage 38 lead toward this bore. These bores are sealed by elements similar to the elements 39, 40 and 41 to prevent leakage between the base 11 and the top body portion 12.

Tapped openings 33 and 34 are also provided within the top body 12 for connection to an appropriate servomechanism. These openings are similarly connected to passages 50 and 51, respectively, terminating in bores 52, 53, 54 and 55, which make connection with other corresponding bores (not shown) leading to passages 62, 63, 64, and 65 in the base 11 making contact with the valve body bore 14. These bores are sealed against leakage between the base 11 and the top portion 12 by means of sealing elements such as the sealing elements 39, 40 and 41, described above. All of the passages terminating within the base 11 make contact with the area surrounding the valve body 15 in the same plane as the valve passages 16, 17 and 18.

From Fig. 6 of the drawing, the operation of the device in controlling a servomechanism (not shown) will be more fully apparent. Normally, the valve rotor 15 is positioned as shown in this figure so as to provide fluid communication between the pressure supply passage 38 and the passage 16 to provide in the latter a reservoir of fluid under pressure. As is apparent from Fig. 6 of the drawing, the valve body 15 when in this position prevents fluid flow in external passages 62, 63, 64, 65, 60 and 61 by sealing off the passages 62, 63, 64 and 65 directly, and by blocking flow to the openings 60 and 61. When the rotor 15 is turned by means of the shaft 22 in a clockwise direction, as shown in Fig. 6, the passages 16 and 38 are placed in communication with the passages 62 and 63 leading to a connected servomechanism. Rotation past the passages 62 and 63 is prevented by a pin 24 attached to the shaft 20 striking a projection 28 attached to the base portion 11. When the rotation is accomplished, the liquid passing through the passages 62 and 63 will flow to the servomotor and liquid will return to the valve through the passages 64 and 65, from the servomotor and thence will flow through the slots 17 and 18 and out through the openings 60 and 61. When the rotor 15 is turned in a counterclockwise direction in the view shown in Fig. 6, the passages 16 and 38 are placed in communication with the passages 64 and 65. Rotation past these passages is prevented by means of the pin 24 striking a projection 29 attached to the base portion 11. As these passages are placed in fluid contact, liquid passing from the inlet 38 through the passage 16 and the passages 64 and 65, connected to a servomotor, as indicated before, will flow through all of these passages in the order named to the servomotor, and thence back through the passages 62 and 63 to the slots 17 and 18 and out through the openings 60 and 61.

One major feature of the invention which is extremely important is the fact that in all positions of the rotor 15 the supply of hydraulic liquid is balanced in the reservoir 16 of the rotor, thus tending to prevent distortion when subjected to high pressures. This equalization of fluid pressure also maintains hydraulic pressure balance on the rotor to make the valve body 15 relatively easy to rotate within the valve body bore 14.

Inasmuch as all of the parts shown in the drawing are extremely simple in design and construction, it is comparatively easy to manufacture the valves of the invention with a minimum of difficulty, using established equipment. The various O-ring seals used are in the category of commercial equipment and can be easily and conveniently inserted within the appropriate elements. This type of seal is particularly effective with the invention herein described because it is comparatively simple and because it provides a very effective seal at high pressures. The O-rings employed are of resilient material, such as rubber, neoprene, or the like, which easily distort when subjected to fluid pressure.

It is always desirable to keep the valve operating forces as low as possible. This means that the surfaces of the valve rotor, Fig. 5, should be surrounded by low balanced hydraulic pressure that is available at the return slots 17 and 18. The pressure side of the hydraulic circuit is confined to pressure reservoir 16 and to the servomotor porting as operationally described earlier. Grooves 66, 67, 68 and 69 may be located in the valve rotor 15 in communication with the slots 17 and 18 as shown in order to insure return hydraulic pressure at both ends of the valve rotor 15. The only moving seal is the O-ring 21 which can only be subjected to return line pressure, thus keeping the friction of this seal to a minimum. For very sensitive valves the O-ring 21 may be eliminated and a close fitting shaft with annular grooves will provide satisfactory sealing against the low return pressure.

Another characteristic of the valve described is the small change required in design to make it an open center valve instead of a closed center valve as indicated.

An open center valve is one in which there is a flow of hydraulic fluid at all times through the hydraulic circuit-pressure to return. This is accomplished as shown in Fig. 7 by increasing the size of the pressure reservoir 16 to uncover part of the passages 62, 63, 64 and 65 while the valve is in neutral. Also, the slots 17 and 18 are increased in depth so they also uncover part of the passages 62, 63, 64 and 65. This allows fluid to pass directly from the pressure passage 38 into the return openings 60 and 61 by way of the servomotor porting.

The herein disclosed and described invention is capable of wide modification within the scope of the disclosure. Such modifications, insofar as defined by the appended claims and are within the skill of the art, are to be considered as part of this invention.

I claim as my invention:

1. In a rotary valve, the combination of: a body having a cavity therein and a plurality of ports opening into said cavity, said ports including a fluid supply port, a pair of opposed interconnected fluid exhaust ports, a first pair of opposed interconnected control ports and a second pair of opposed interconnected control ports; and a rotor rotatably positioned within said cavity, said rotor having three substantially parallel passages therein, the axis of each of said passages being perpendicular to the axis of rotation of said rotor, the central of said passages being a supply passage and the other two of said passages being return passages, said rotor having a neutral, a right and a left position, said supply passage communicating with said supply port and each of said return passages communicating respectively with one of said exhaust ports when said rotor is in said neutral position, said supply passage coupling said supply port to said first pair of control ports and each of said return passages coupling respectively one of said second pair of control ports to one of said pair of exhaust ports when said rotor is in said left position, and said supply passage coupling said supply port to said second pair of control ports and each of said return passages coupling respectively one of said first pair of control ports to one of said pair of exhaust ports when said rotor is in said right position.

2. A rotary valve as defined in claim 1, in which the axes of said plurality of ports and of said three passages lie in substantially the same plane.

3. A rotary valve as defined in claim 1, in which said rotor includes a plug portion containing said passages and a shaft portion for rotating said rotor, said shaft portion having a lesser cross-sectional area perpendicular to said axis of rotation than said plug portion, said plug portion including opposed axial grooves in the outer surface thereof, said grooves extending between said return passages and each end of said plug portion.

4. A rotary valve as defined in claim 1, in which said supply passage couples said supply port to each of said control ports, and each of said return passages couples respectively one of said exhaust ports to one of said first pair of control ports and one of said second pair of control ports when said rotor is in said neutral position.

References Cited in the file of this patent

UNITED STATES PATENTS

| | | |
|---|---|---|
| 916,262 | Brocke | Mar. 23, 1909 |
| 1,801,717 | Brooks | Apr. 21, 1931 |
| 2,165,096 | Frenchette | July 4, 1939 |
| 2,182,459 | Vickers | Dec. 5, 1939 |
| 2,229,933 | Parker | Jan. 28, 1941 |
| 2,371,657 | Stark | Mar. 20, 1945 |